United States Patent
Cho et al.

(10) Patent No.: US 9,678,336 B2
(45) Date of Patent: Jun. 13, 2017

(54) LENS ASSEMBLY

(71) Applicant: Genius Electronic Optical Co., Ltd., Taichung (TW)

(72) Inventors: Hung-Chang Cho, Taichung (TW); Zhenmu Chen, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 8 days.

(21) Appl. No.: 14/849,898

(22) Filed: Sep. 10, 2015

(65) Prior Publication Data

US 2016/0370579 A1    Dec. 22, 2016

(30) Foreign Application Priority Data

Jun. 17, 2015  (CN) .......................... 2015 1 0336281

(51) Int. Cl.
| | |
|---|---|
| *G02B 27/00* | (2006.01) |
| *G02B 7/02* | (2006.01) |
| *G02B 5/00* | (2006.01) |
| G02B 13/00 | (2006.01) |

(52) U.S. Cl.
CPC ......... *G02B 27/0018* (2013.01); *G02B 5/005* (2013.01); *G02B 7/021* (2013.01); *G02B 7/025* (2013.01); *G02B 13/004* (2013.01)

(58) Field of Classification Search
CPC ..... G02B 27/0018; G02B 7/021; G02B 7/025
USPC ........................................................ 359/601
See application file for complete search history.

(56) References Cited

U.S. PATENT DOCUMENTS

| | | | |
|---|---|---|---|
| 8,736,989 B2* | 5/2014 | Wu ........................ | G02B 7/025 359/811 |
| 9,016,876 B2* | 4/2015 | Lai ..................... | G02B 13/0035 359/601 |
| 2011/0096213 A1* | 4/2011 | Hasegawa .......... | G02B 13/0035 348/294 |

FOREIGN PATENT DOCUMENTS

| | | |
|---|---|---|
| TW | 200630645 | 9/2006 |
| TW | 200823510 | 6/2008 |
| TW | 201037385 | 10/2010 |
| TW | 201411217 | 3/2014 |

OTHER PUBLICATIONS

"Office Action of Taiwan Counterpart Application", issued on Jul. 1, 2016, p. 1-p. 5.

* cited by examiner

*Primary Examiner* — Bumsuk Won
*Assistant Examiner* — Grant Gagnon
(74) *Attorney, Agent, or Firm* — Jianq Chyun IP Office

(57) ABSTRACT

A lens assembly includes a lens barrel, a plurality of lenses and at least one light-shielding member. The lens barrel extends along an axis and includes a peripheral wall that surrounds the axis and defines a receiving chamber. The peripheral wall has open and aperture-forming ends that are opposite to each other and respectively adjacent to image and object sides of the lens assembly. The lenses are disposed in the receiving chamber in sequence along the axis between the aperture-forming and open ends. The light-shielding member is disposed in the receiving chamber and includes an annular light-shielding body and an adhesive layer for positioning the annular light-shielding body relative to at least one of the lenses.

6 Claims, 8 Drawing Sheets

US 9,678,336 B2

LENS ASSEMBLY

CROSS-REFERENCE TO RELATED APPLICATION

This application claims priority of Chinese Patent Application No. 201510336281.2, filed on Jun. 17, 2015.

FIELD

The disclosure relates to an optical apparatus, and more particularly to a lens assembly including an adhesive light-shielding member.

BACKGROUND

Referring to FIG. 1, a conventional lens assembly includes a lens barrel 1, a plurality of lenses 2 that are mounted in the lens barrel 1, a plurality of light-shielding members 3 that are mounted among the lenses 2, and a retaining ring 4 for retaining the lenses 2 in the lens barrel 1. The lenses 2 are disposed in sequence from an object side 101 toward an image side 102 of the conventional lens assembly. For achieving better retainment of the lenses 2 relative to the lens barrel 1, after the retaining ring 4 is mounted in the lens barrel 1 in a position proximate to the image side 102, a plurality of adhesive elements 5 are disposed at an interconnection area between the retaining ring 4 and the lens barrel 1 in an adhesive-dispensing manner so as to secure the retaining ring 4 to the lens barrel 1.

In the aforementioned conventional lens assembly, the light-shielding members 3 disposed among the lenses 2 are able to block flare around the lenses 2. However, since the light-shielding members 3 are relatively small-sized and thin, dislocation during assembly is likely to occur, which adversely affects imaging quality. Moreover, the conventional lens assembly requires securing of the lenses 2 with the retaining ring 4 after the last one of the lenses 2 is mounted, followed by dispensing and curing the adhesive elements 5. The assembling procedures of the conventional lens assembly are relative complicated.

Referring to FIG. 2, another conventional lens assembly includes a lens barrel 6, a plurality of lenses mounted in the lens barrel 6, a plurality of light-shielding members 8 mounted among the lenses 7, and an adhesive element 9 for retaining the lenses 7 in the lens barrel 6. This conventional lens assembly differs from the abovementioned conventional lens assembly of FIG. 1 in the omission of the retaining ring (see FIG. 1) to be mounted after mounting of the last one of the lenses 7 (referred to as the last lens 7 hereinafter) in the lens barrel 6 is completed. The last lens 7 is directly bonded to the lens barrel 6 through the adhesive element 9 disposed at the interconnection area therebetween.

However, apart from the adverse effect on imaging due to dislocation of the light-shielding members 8 during assembly, coating of the adhesive element 9 tends to interfere with an effective optical path of the last lens 7 and there is still room for improvement in the lens assembly.

SUMMARY

Therefore, an object of the disclosure is to provide a lens assembly that can alleviate at least one of the drawbacks of the prior arts.

According to the disclosure, a lens assembly includes a lens barrel, a plurality of lenses and at least one light-shielding member.

The lens barrel extends along an axis and includes a peripheral wall that surrounds the axis and defines a receiving chamber. The peripheral wall has an open end that is in spatial communication with the receiving chamber and adjacent to an image side of the lens assembly, and an aperture-forming end that is opposite to the open end and adjacent to an object side of the lens assembly.

The lenses are disposed in the receiving chamber defined by the peripheral wall in sequence along the axis between the aperture-forming end and the open end of the lens barrel.

The light-shielding member is disposed in the receiving chamber defined by the peripheral wall and includes an annular light-shielding body and at least one adhesive layer that is bonded to the annular light-shielding body. The annular light-shielding body is adjacent to at least one of the lenses and is positioned relative to the at least one lenses through the adhesive layer.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
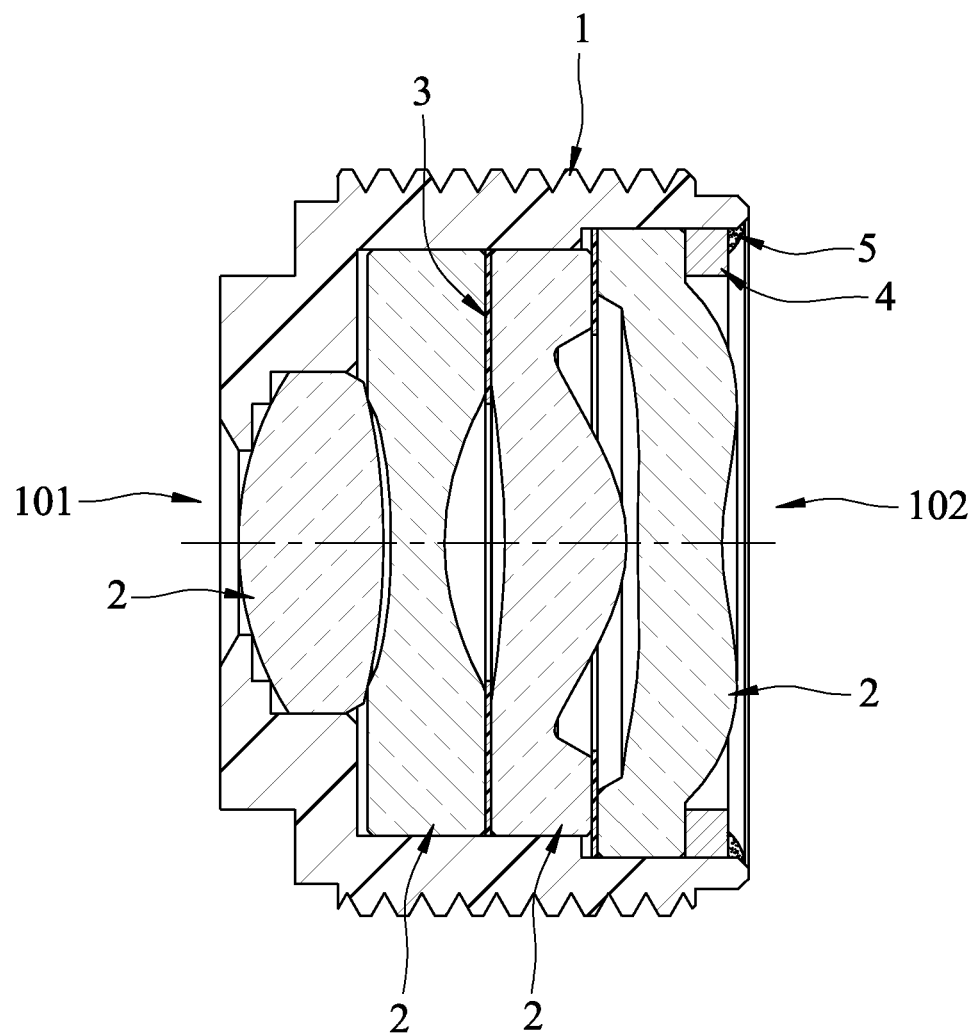
FIG. 1 is a sectional view of one type of conventional lens assemblies.
Figure 2:
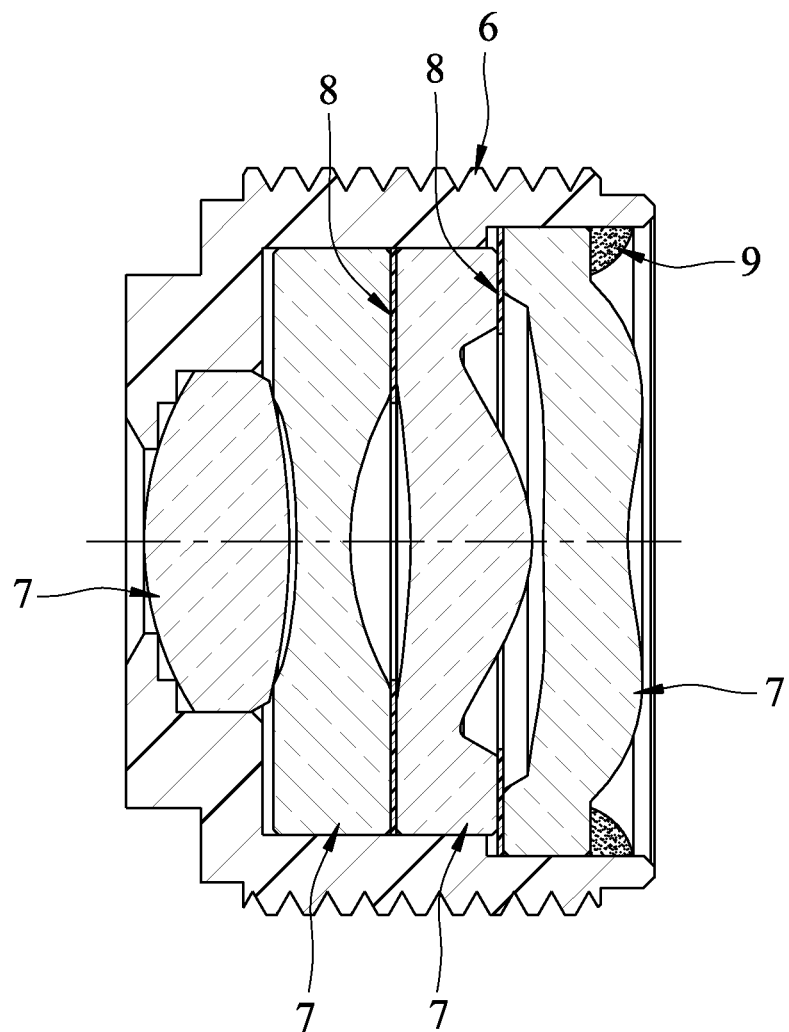
FIG. 2 is a sectional view of another type of conventional lens assemblies.

Before the disclosure is described in greater detail, it should be noted that like elements are denoted by the same reference numerals throughout the disclosure.

Figure 3:
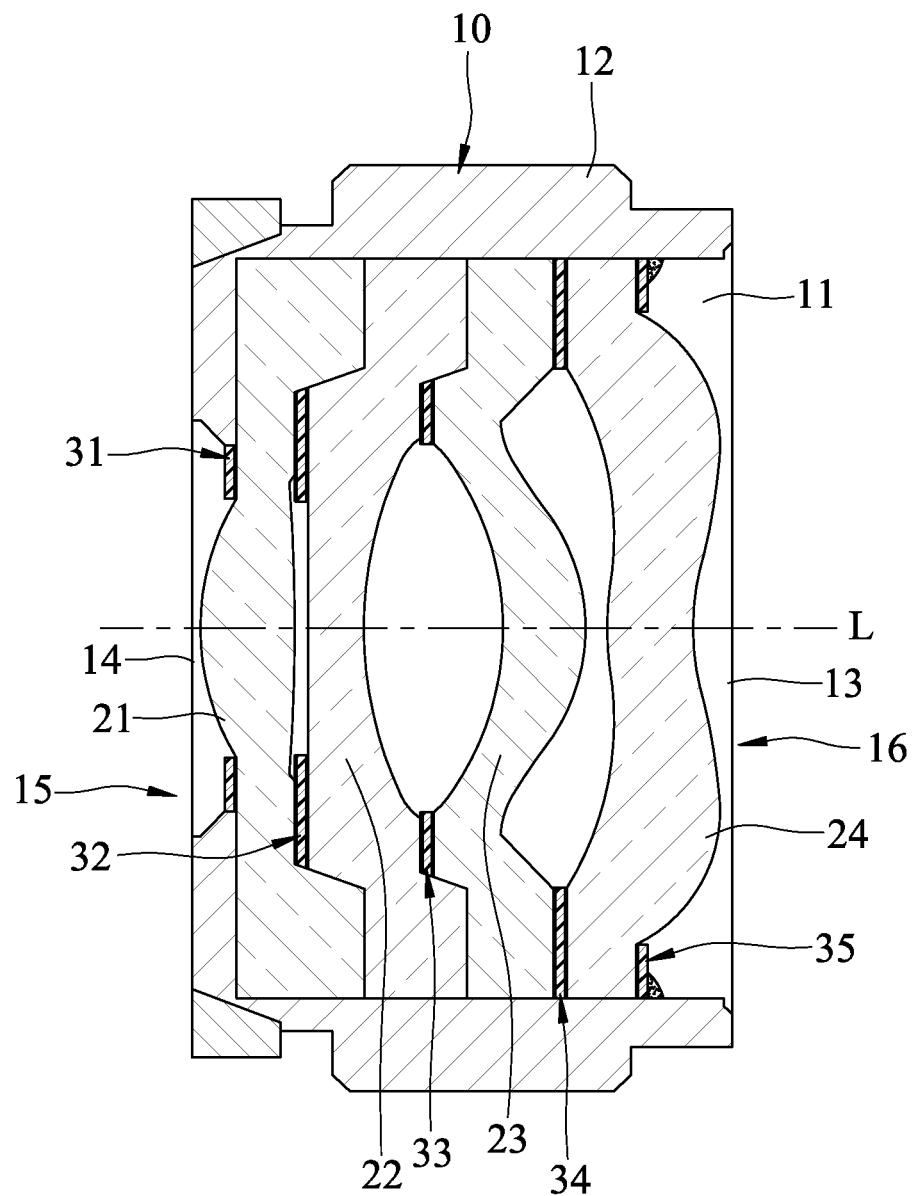
FIG. 3 is a sectional view of the first embodiment of a lens assembly according to the disclosure.
Figure 4:
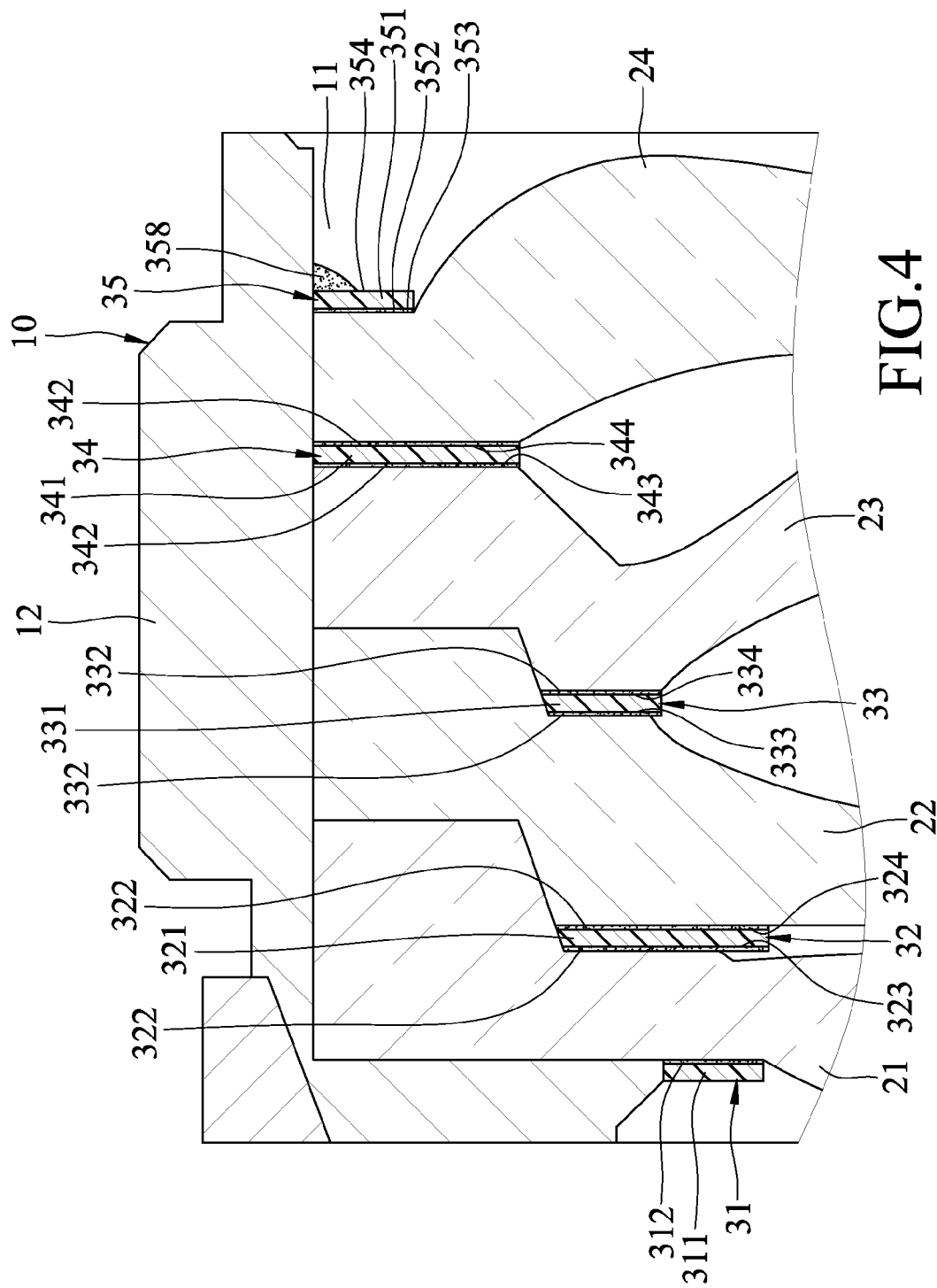
FIG. 4 is a fragmentary enlarged sectional view of FIG. 3.
Figure 5:
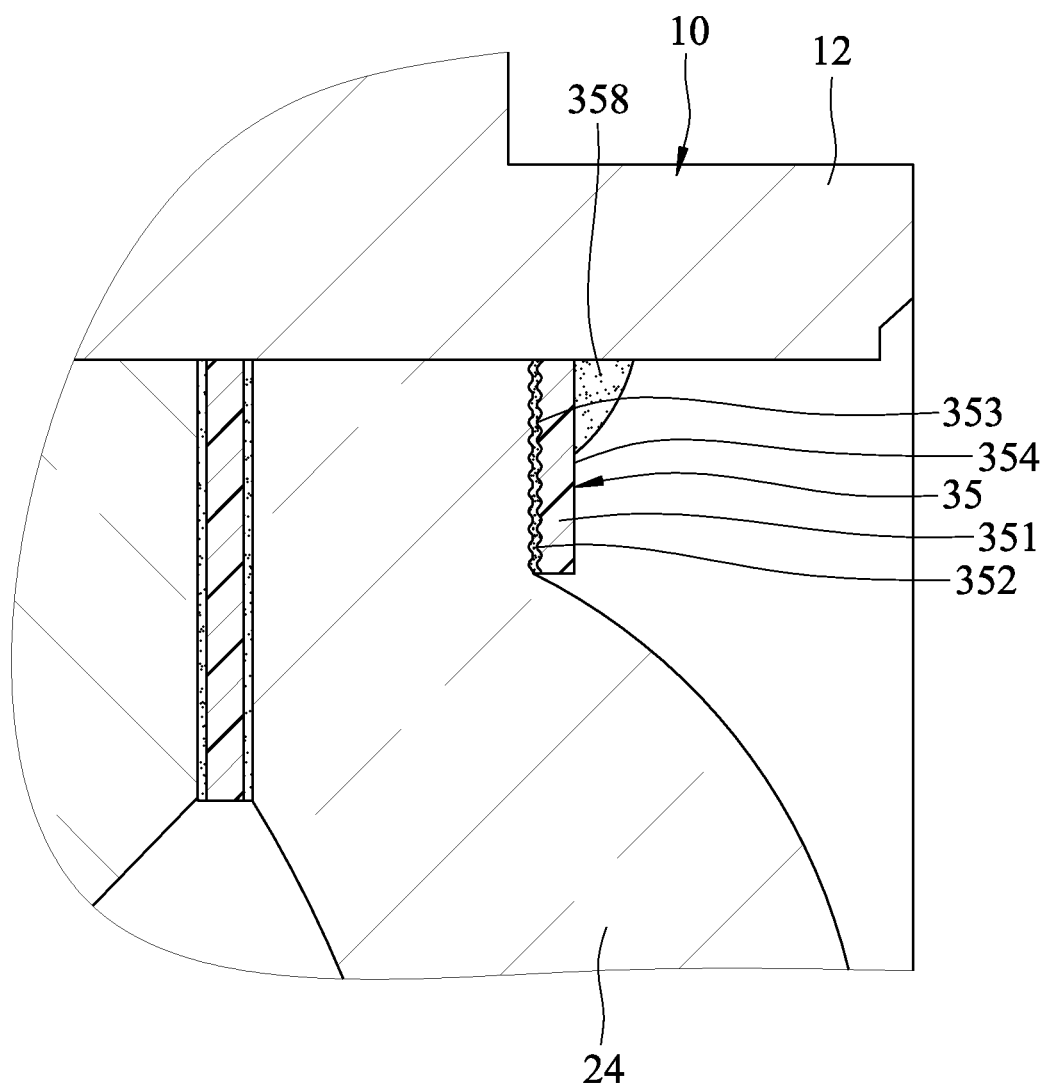
FIG. 5 is a partly enlarged sectional view of FIG. 3.

Referring to FIGS. 3 and 4, the first embodiment of a lens assembly according to the disclosure includes a lens barrel 10, a plurality of lenses 21, 22, 23, 24 and a plurality of light-shielding members 31, 32, 33, 34, 35.

The lens barrel 10 extends along an axis (L) and includes a peripheral wall 12 that surrounds the axis (L) and defines a receiving chamber 11. The peripheral wall 12 has an open end 13 that is in spatial communication with the receiving chamber 11 and adjacent to an image side 16 of the lens assembly, and an aperture-forming end 14 that is opposite to the open end 13 and adjacent to an object side 15 of the lens assembly.

The lenses 21, 22, 23, 24 are disposed in the receiving chamber 11 defined by the peripheral wall 12 in the given order along the axis (L) between the aperture-forming end 14 and the open end 13 of the lens barrel 10. Among the lenses 21, 22, 23, 24, the lens 21 is most adjacent to the object side 15 and the lens 24 is most adjacent to the image side 16.

In this embodiment, there are five light-shielding members 31, 32, 33, 34, 35. The light-shielding members 31, 32, 33, 34, 35 are disposed in the receiving chamber 11 defined by the peripheral wall 12.

Among the light-shielding members 31, 32, 33, 34, 35, the light-shielding member 31 is most adjacent to the object side 15 and serves as an aperture. The light-shielding member 31 includes an annular light-shielding body 311 and an adhesive layer 312 bonded to the annular light-shielding body 311. The annular light-shielding body 311 is positioned relative to the lens 21 through the adhesive layer 312.

The light-shielding member 32 is disposed between the lens 21 and the lens 22, and includes an annular light-shielding body 321 and a pair of adhesive layers 322 bonded to the annular light-shielding body 321. The annular light-shielding body 321 has a first surface 323 that is perpendicular to an extension direction of the axis (L) and bonded with one of the adhesive layers 322, and a second surface 324 that is opposite to the first surface 323 and bonded with the other of the adhesive layers 322. The annular light-shielding body 321 is bonded between the lens 21 and the lens 22 through the adhesive layers 322.

The light-shielding member 33 is disposed between the lens 22 and the lens 23, and includes an annular light-shielding body 331, and a pair of adhesive layers 332 bonded to the annular light-shielding body 331. The annular light-shielding body 331 has a first surface 333 that is perpendicular to the extension direction of the axis (L) and bonded with one of the adhesive layers 332, and a second surface 334 that is opposite to the first surface 333 and bonded with the other of the adhesive layers 332. The annular light-shielding body 331 is bonded between the lens 22 and the lens 23 through the adhesive layers 332.

The light-shielding member 34 is disposed between the lens 23 and the lens 24, and includes an annular light-shielding body 341, and a pair of adhesive layers 342 bonded to the annular light-shielding body 341. The annular light-shielding body 341 has a first surface 343 that is perpendicular to the extension direction of the axis (L) and bonded with one of the adhesive layers 342, and a second surface 344 that is opposite to the first surface 333 and bonded with the other of the adhesive layers 342. The annular light-shielding body 341 is bonded between the lens 23 and the lens 24 through the adhesive layers 342.

Among the light-shielding members 31, 32, 33, 34, 35, the light-shielding member 35 is most adjacent to the image side 16 and serves as a retaining ring. The light-shielding member 35 includes an annular light-shielding body 351 and an adhesive layer 352 bonded to the annular light-shielding body 351. The annular light-shielding body 351 has a substantially rectangular cross section parallel to the extension direction of the axis (L) and is positioned relative to the lens 24 through the adhesive layer 352. Moreover, the annular light-shielding body 351 has a first surface 353 that is perpendicular to the extension direction of the axis (L) and bonded with the adhesive layer 352, and a second surface 354 that is opposite to the first surface 353 and applied with an adhesive element 358 through adhesive-dispensing techniques. The annular light-shielding body 351 is bonded to the lens 24 through the adhesive layer 352 and is secured to the peripheral wall 12 through the adhesive element 358. As shown in Figures, the adhesive layer 352 may be coarse-surfaced.

During assembly of the lens assembly, by means of arrangement of the adhesive layers 322 on the first and second surfaces 323, 324 of the light-shielding member 32, respectively, the adjacent lenses 21, 22 sandwiching the light-shielding member 32 therebetween are easily positioned relative to each other; by means of arrangement of the adhesive layers 332 on the first and second surfaces 333, 334 of the light-shielding member 33, respectively, the adjacent lenses 22, 23 sandwiching the light-shielding member 33 are easily positioned relative to each other; and by means of arrangement of the adhesive layers 342 on the first and second surfaces 343, 344 of the light-shielding member 34, respectively, the adjacent lenses 23, 24 sandwiching the light-shielding member 34 are easily positioned relative to each other. Consequently, flare around the lenses 21, 22, 23, 24 is blocked and dislocation of the light-shielding members 32, 33, 34 during assembly of the lens assembly is prevented. The lens assembly thus formed has an improved and consistent image quality, is produced at a relatively low cost and is efficiently assembled.

Furthermore, since the light-shielding member 31 is most adjacent to the object side 15 and serves as the aperture and since the annular light-shielding body 311 is positioned relative to the lens 21 through the adhesive layer 312, the aperture may have a simplified structure and design. Furthermore, since the light-shielding member 35 is most adjacent to the image side 16 and serves as the retaining ring and is secured to the peripheral wall 12 of the lens barrel 10 through the adhesive element 358, the lenses 21, 22, 23, 24 are subjected to pressing by the light-shielding member 35 so as to be secured in the lens barrel 10. In addition, the annular light-shielding body 351 is positioned relative to the lens 24 through the adhesive layer 352. Consequently, during assembly of the lens assembly, interference in the effective optical path is prevented and the required image quality is maintained. Additionally, by virtue of formation of the coarse-surfaced adhesive layer 352, blocking of flare around the lenses 21, 22, 23, 24 is enhanced.

Figure 6:
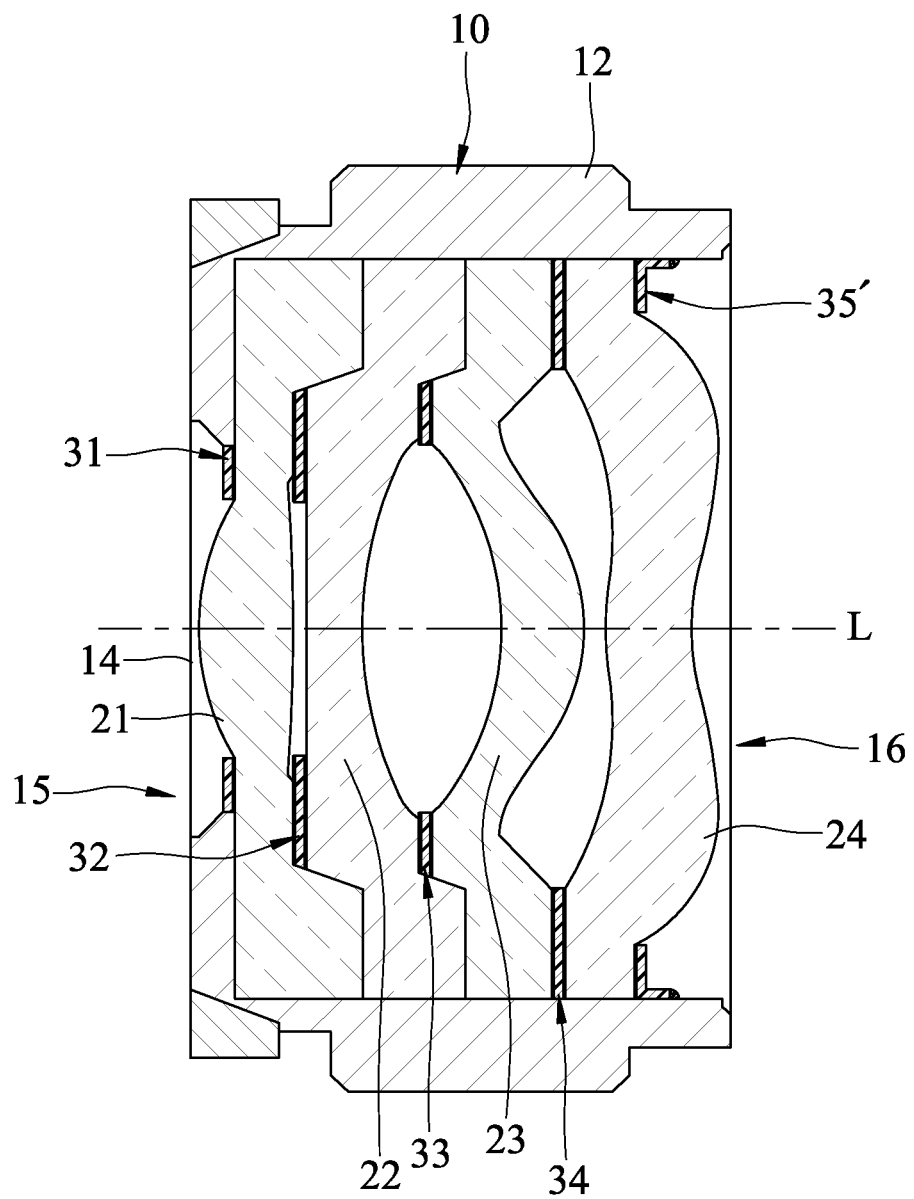
FIG. 6 is a sectional view of the second embodiment of a lens assembly according to the disclosure.
Figure 7:
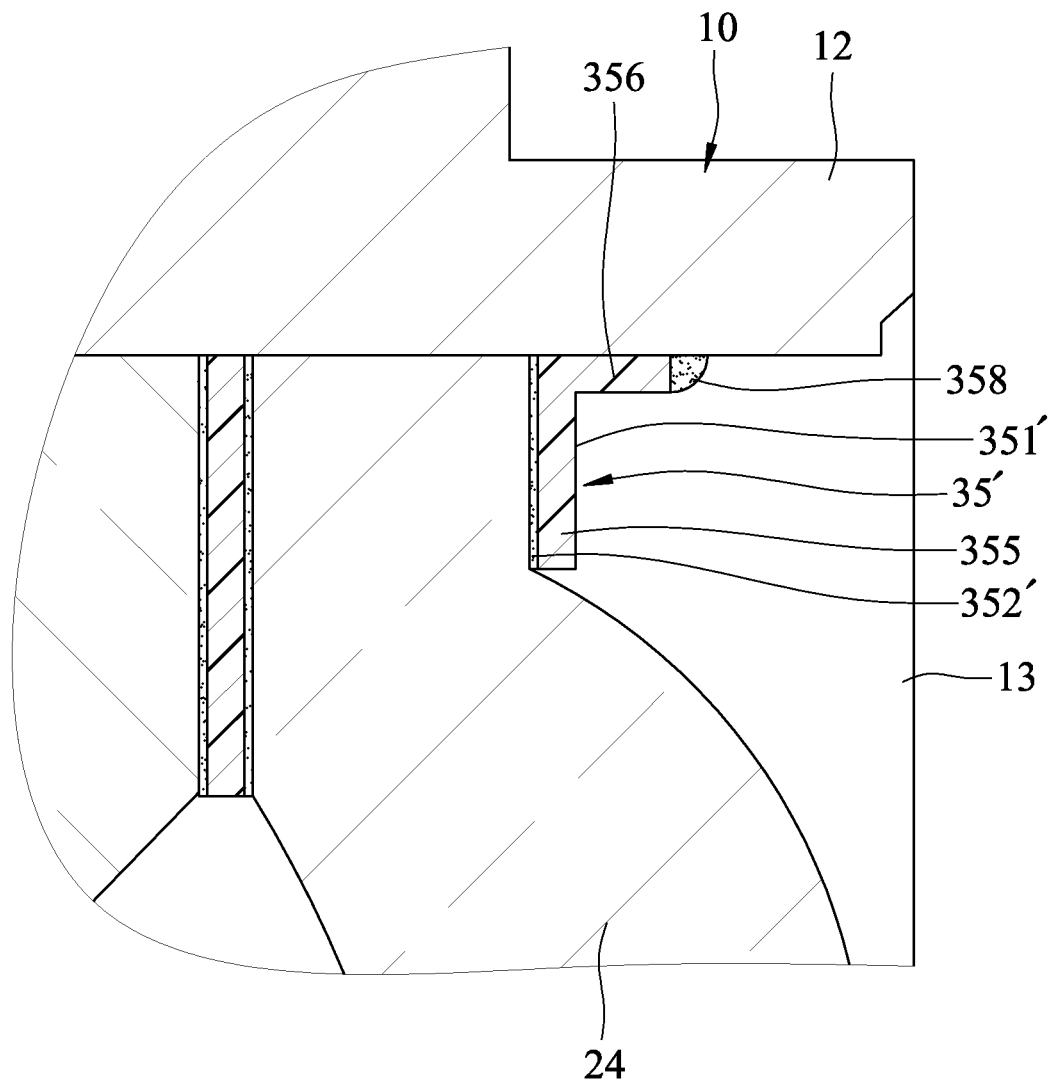
FIG. 7 is a partly enlarged sectional view of FIG. 6.

Referring to FIGS. 6 to 7, the second embodiment of a lens assembly according to the disclosure has a structure similar to that of the first embodiment except for the configuration of the light-shielding member 35' that is most adjacent to the image side 16 and that serves as the retaining ring. The light-shielding member 35' has an annular light-shielding body 351' having an annular base portion 355 that is bonded to the lens 24 through an adhesive layer 352' and that is perpendicular to the extension direction of the axis (L) and a peripheral extension portion 356 that extends from a periphery of the base portion 355 in the extension direction of along the axis (L). The peripheral extension portion 356 has a free end formed with the adhesive element 358 by adhesive-dispensing techniques so as to be connected to and positioned relative to the peripheral wall 12 therewith.

Similar to the first embodiment, by way of formation of the adhesive layer 352' and the adhesive element 358, the annular light-shielding body 351' is positioned relative to the lens 24 and the light-shielding member 35' is connected to and positioned relative to the peripheral wall 12. Then, the lenses 21, 22, 23, 24 are subjected to pressing by the light-shielding member 35' with the assistance of the adhesive element 358 so as to be secured in the lens barrel 10. Consequently, interference in the effective optical path is prevented during assembly of the lens assembly and the required image quality is maintained.

Figure 8:
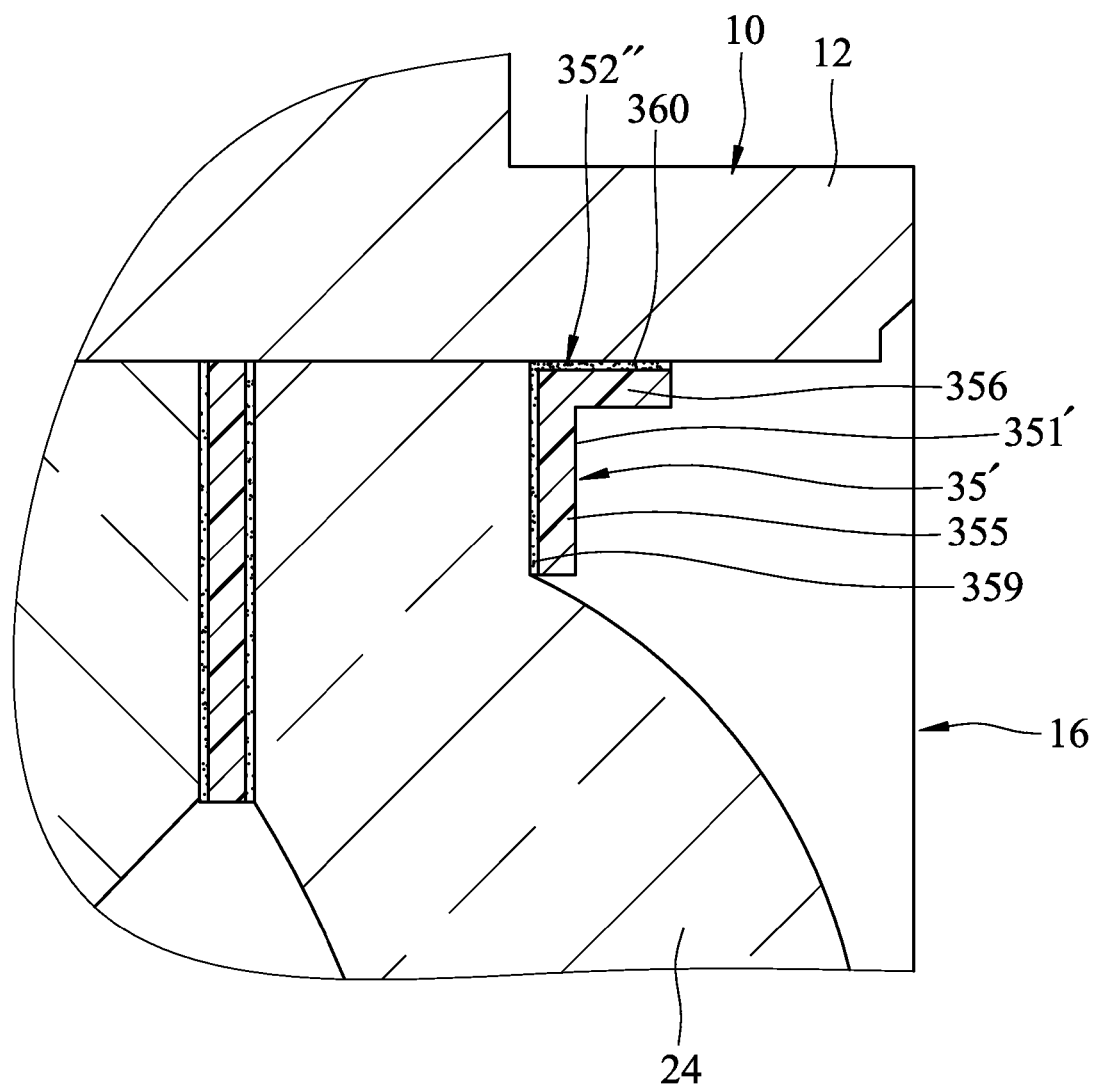
FIG. 8 is a sectional view similar to FIG. 7 for illustrating the third embodiment of a lens assembly according to the disclosure.

Referring to FIG. 8, the third embodiment of a lens assembly according to the disclosure has a structure similar to that of the second embodiment except for the configuration of the adhesive layer 352" bonded to the annular light-shielding body 351' and omission of the adhesive element 358' (see FIG. 7). The adhesive layer 352" includes an adhesive base portion 359 that is interposed between the annular base portion 355 of the annular light-shielding body 351' and the lens 24, and an adhesive extension portion 360 that extends from the adhesive base portion 359 and is interposed between the peripheral wall 12 and the peripheral extension portion 356 of the annular light-shielding body 351'.

Similar to the first and second embodiments, by way of formation of the adhesive layer 352", the annular light-shielding body 351' is positioned relative to the lens 24 and the light-shielding member 35' is connected to and positioned relative to the peripheral wall 12. Then, the lenses 21, 22, 23, 24 (see FIG. 6) are subjected to pressing by the light-shielding member 35' having the adhesive layer 352" so as to be secured in the lens barrel 10. Consequently, interference in the effective optical path is prevented during assembly of the lens assembly and the required image quality is maintained.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lens assembly, comprising:

a lens barrel that extends along an axis and includes a peripheral wall surrounding the axis and defining a receiving chamber, the peripheral wall having an open end that is in spatial communication with said receiving chamber and adjacent to an image side of the lens assembly, and an aperture-forming end that is opposite to said open end and adjacent to an object side of said lens assembly;

a plurality of lenses that are disposed in said receiving chamber defined by said peripheral wall in sequence along the axis between said aperture-forming end and said open end of said lens barrel;

a first light-shielding member that is disposed in said receiving chamber defined by said peripheral wall and includes a first annular light-shielding body and a first adhesive layer bonded to said first annular light-shielding body, said first annular light-shielding body being adjacent to one of the lenses that is most adjacent to the open end and being positioned relative to said lens through said first adhesive layer, wherein said first light-shielding member has a first surface that is perpendicular to an extension direction of the axis and entirely bonded to said lens through said first adhesive layer and a second surface opposite to said first surface and facing said open end; and at least one second light-shielding member that is disposed in the said receiving chamber defined by said peripheral wall and includes a second annular light-shielding body and at least one second adhesive layer bonded to said second annular light-shielding body, said second annular light-shielding body being adjacent to at least one of the lenses and being positioned relative to said at least one of lenses through said second adhesive layer.

2. The lens assembly of claim 1, wherein said first adhesive layer is coarse-surfaced.

3. The lens assembly of claim 1, wherein said first annular light-shielding body of said first light-shielding member has an annular base portion that is bonded to said lens through said first adhesive layer and perpendicular to the extension direction of the axis, and an peripheral extension portion that extends from said first annular base portion in the extension direction of the axis, said peripheral extension portion having a free end formed with an adhesive element so as to be connected to and positioned relative to said peripheral wall.

4. The lens assembly of claim 1, wherein said first annular light-shielding body of said first light-shielding member has an annular base portion that is bonded to said lens through said first adhesive layer and perpendicular to the extension direction of the axis, and a peripheral extension portion that extends from said first annular base portion along the axis, said first adhesive layer including an adhesive base portion that is bonded between said base portion of said first annular light-shielding body and said lens, and an adhesive extension portion that extends from said adhesive base portion and is bonded between said peripheral wall and said peripheral extension portion of said first annular light-shielding body.

5. The lens assembly of claim 1, wherein said second light-shielding member has two of said second adhesive layers, said second annular light-shielding body of said second light-shielding member having a first surface that is perpendicular to an extension direction of the axis and bonded with one of said second adhesive layers, and a second surface that is opposite to said first surface and bonded with the other of said second adhesive layers, said second annular light-shielding body being bonded between two adjacent ones of said lenses through the second adhesive layers.

6. The lens assembly of claim 1, wherein said at least one lens is most adjacent to said aperture-forming end, and said second annular light-shielding body of said second light-shielding member are bonded to said at least one lens through said second adhesive layer.

* * * * *